United States Patent [19]
Martinie

[11] Patent Number: 5,417,500
[45] Date of Patent: May 23, 1995

[54] BEARING ASSEMBLY UTILIZING IMPROVED CLAMPING COLLAR

[75] Inventor: Howard M. Martinie, Simpsonville, S.C.

[73] Assignee: Reliance Electric Industrial Company, Greenville, S.C.

[21] Appl. No.: 120,584

[22] Filed: Sep. 13, 1993

[51] Int. Cl.⁶ ............................................. F16C 17/02
[52] U.S. Cl. .................. 384/513; 384/537; 384/569; 384/585
[58] Field of Search ............... 384/537, 513, 569, 542, 384/541, 585

[56] References Cited

U.S. PATENT DOCUMENTS

| | | |
|---|---|---|
| Re. 26,591 | 5/1969 | Kay ........................ 384/585 |
| 1,687,806 | 10/1928 | Strong . |
| 3,276,828 | 10/1966 | Mansfield . |
| 4,403,814 | 9/1983 | Koss et al. ................ 384/541 |
| 4,537,519 | 8/1985 | LaRou et al. .................... 8/85 |
| 4,687,351 | 8/1987 | Martinie . |

OTHER PUBLICATIONS

Winfred M. Berg, Inc. catalog B-8, 1988, p. H516.
P. 127 of publication showing NYLA-K Precision Mounted Ball Bearings with patented CEN-TRIK-LOK Shaft locking device (no date).
Seal Master publication, pp. 8-9 and 83, showing Gold Line with Skwezloc The Ultimate in Shaft Locking Devices (no date).

*Primary Examiner*—Lenard A. Footland
*Attorney, Agent, or Firm*—Dority & Manning

[57] ABSTRACT

A bearing assembly adapted to be secured to an elongated shaft. An inner race of the bearing assembly includes a clamping portion having a plurality of circumferentially spaced axial slots to form respective clamping fingers. A clamping collar mounts about the clamping fingers and is tightened to force the clamping fingers into clamping engagement with the shaft. The clamping collar has therein at least one relief indentation to provide enhanced flexibility. The enhanced flexibility allows a greater clamping force to be applied to the clamping fingers, and thus to the shaft.

18 Claims, 4 Drawing Sheets

BEARING ASSEMBLY UTILIZING IMPROVED CLAMPING COLLAR

BACKGROUND OF THE INVENTION

The present invention generally concerns means for clamping a bearing assembly to an elongated shaft. More particularly, the invention relates to a bearing assembly which may be secured to a shaft utilizing an improved clamping collar.

Bearing assemblies, such as pillow blocks, are often designed to be quickly attached to a shaft. Typically, the bearing assembly is first slipped along the shaft to the desired position. Once there, the inner race of the bearing assembly is secured utilizing one of various clamping techniques.

A common clamping method involves the use of set screws radially threaded through an axial extension of the inner race. Such set screws directly engage the shaft, thus maintaining the bearing assembly firmly in position. Alternatively, an annular collar may be fitted over the axial extension such that threaded bores in the collar are in register with radial bores in the extension (which may or may not be threaded). Another common clamping technique utilizes an eccentric collar. Like methods utilizing set screws, eccentric collars provide a relatively high degree of clamping force.

An additional clamping method is disclosed in U.S. Pat. No. 3,276,828. This technique utilizes a split annular collar inserted over an inner race extension. In this case, the extension includes a number of circumferentially spaced axial slots which form respective clamping fingers. The collar includes a screw, which is used to tighten the clamping collar about the clamping fingers. As a result, the clamping fingers are pushed into locking engagement with the shaft.

Due to its design, the split collar, or "hose clamp", technique generally offers one or more of the following advantages over other clamping methods: less marring of the shaft, easy attachment and removal, greater concentricity of the bearing and the shaft, less fretting corrosion, less tendency to fracture the inner race extension, less distortion of the raceway and fewer set screws to loosen. A significant disadvantage of this technique, however, is that it provides substantially lower clamping forces than the set screw and eccentric collar techniques discussed above. As a result, it is been found unsuitable for many applications.

In an effort to provide sufficient clamping force while retaining some of the advantages of the clamping collar design, a "hybrid" shaft locking method has been developed. This method, which is disclosed in U.S. Pat. No. 4,403,814, utilizes an annular collar fitted over an inner race extension having four clamping fingers. A pair of clamping fingers are tightened to force a respective two of the clamping fingers into engagement with the shaft. Reaction by the collar then pulls the other two clamping fingers into shaft engagement. While generally providing greater clamping force than the "hose clamp" method, this design reintroduces some of the disadvantages of set screw techniques.

SUMMARY OF THE INVENTION

The present invention recognizes and addresses the foregoing disadvantages, and others of prior art constructions and methods.

Accordingly, it is an object of the present invention to provide an improved clamping assembly for securing a bearing to an elongated shaft.

It is another object of the present invention to provide a bearing assembly incorporating a split collar clamping design which has significantly greater clamping force in comparison with prior art designs.

It is a further object of the present invention to provide an improved clamping collar for use in securing a bearing assembly to an elongated shaft.

Some of these objects are accomplished by an improved bearing assembly constructed in accordance with the present invention. Such a bearing assembly comprises an inner race defining a first annular raceway surface. The bearing assembly further comprises an outer race defining a second annular raceway surface. A plurality of bearing elements are disposed between the first annular raceway surface and the second annular raceway surface to permit relative rotation between the inner race and the outer race.

Generally, the inner race is constructed as an axial member defining a shaft-receiving bore. An integral clamping portion extends from the inner race and defines a plurality of circumferentially spaced slots which form respective clamping fingers. A clamping collar defining a circumferential gap is mountable about the clamping fingers. The clamping collar further defines at least one relief indentation to provide enhanced flexibility to the collar. Tightening means, preferably a screw, draw opposed gap faces of the circumferential gap closer together to forcibly push the clamping fingers into engagement with the shaft. Due to the enhanced flexibility, a greater clamping force is transmitted to the clamping fingers to firmly secure the bearing assembly in position.

Some presently preferred clamping collars may include a relief indentation formed as a radial slot. Such a radial slot may extend from the inner circumferential surface of the collar angularly opposite the gap. Suitable relief indentations may also take the form of notches in the outer circumferential surface of the clamping collar.

An integral bulging portion may protrude from a circumferential outer surface of the clamping collar in an outward radial direction. First and second integral lobes extending radially outward adjacent respective sides of the circumferential gap may also be provided.

Other objects, features and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures, in which.

Figure 1:
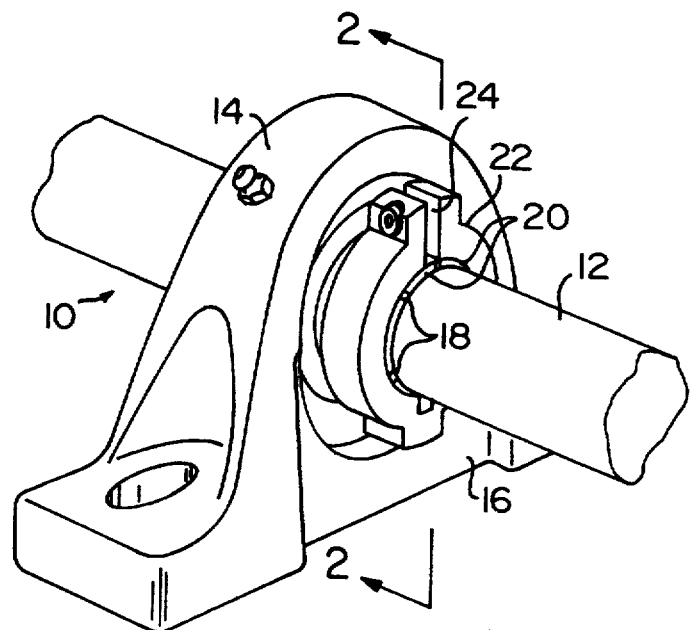
FIG. 1 is a perspective view of an improved bearing assembly constructed in accordance with the present invention.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary constructions.

Figure 2:
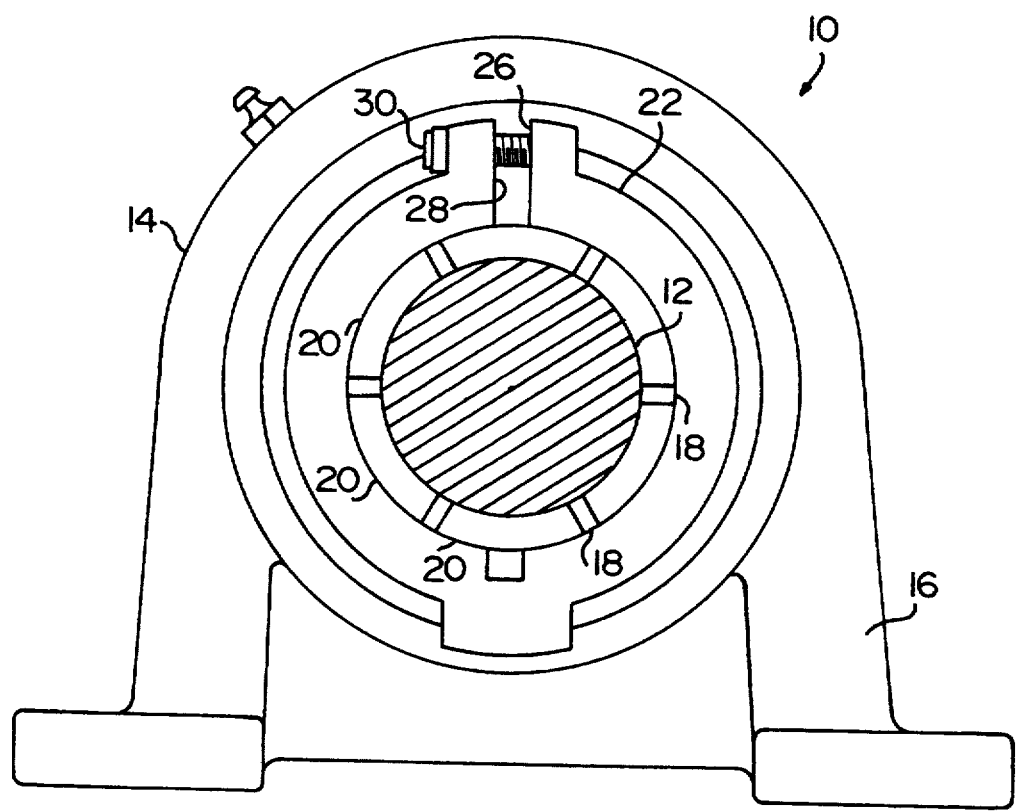
FIG. 2 is a frontal view of the bearing assembly of FIG. 1 as taken along line 2—2.

Referring to FIGS. 1 and 2, a bearing assembly 10 constructed according to the present invention is shown secured an elongated shaft 12. Generally, bearing assembly 10 is contained within a housing 14 of a pillow block 16. The inner race of bearing assembly 10 includes an axial clamping portion having a plurality of circumferentially spaced axial slots 18. Slots 18 thereby form a number of clamping fingers 20 around shaft 12. A clamping collar 22, having a circumferential gap 24, is mounted about clamping fingers 20. When tightened by screw 30, opposed gap faces 26, 28 of gap 24 are drawn closer together, thus forcing clamping fingers 20 into engagement with shaft 12.

Figure 3:
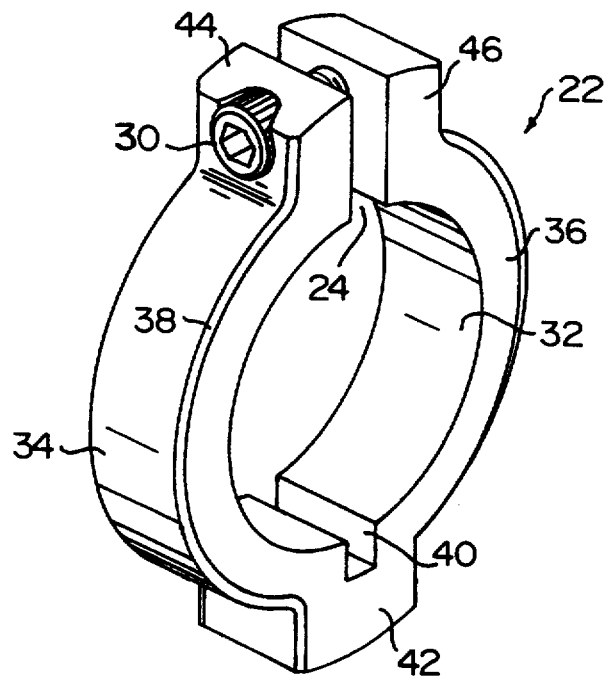
FIG. 3 is a perspective view of the clamping collar utilized in the improved bearing assembly illustrated in FIGS. 1 and 2.

The configuration of clamping collar 22 is most easily understood with reference to FIG. 3. As can be seen, collar 22 generally has a circumferential inner surface 32 and a circumferential outer surface 34 webbed by a front surface 36 and a similar back surface. Intersecting edges may be beveled as at 38 to reduce sharpness of the edge and enhance the overall aesthetic qualities of collar 22.

As discussed above, a significant disadvantage of split collar clamping designs utilized in the prior art has been a relatively low clamping force. According to the present invention, it has been appreciated that this low clamping force can be attributed to the relatively large cross-sectional area of the collars which have been used. Such a large cross-sectional area was generally believed necessary to accommodate the screw used to tighten the collar. This large cross-section resulted in a rigid collar which limited the clamping force which could be transmitted to the clamping fingers.

To enhance the flexibility of collar 22 over prior art split collar designs and thereby provide greater clamping force, collar 22 defines a radial slot 40. As can be seen, slot 40 extends partially through the extent of collar 22 from inner surface 32 at an angular position generally displaced from gap 24 by 180°. An integral bulging portion 42 protrudes from outer surface 34 radially outward of slot 40. Collar 22 further includes a pair of integral lobes 44, 46 extending radially outward from outer surface 34 adjacent respective sides of gap 24. A threaded bore is formed in lobes 44 and 46 to accommodate screw 30.

Figure 4:
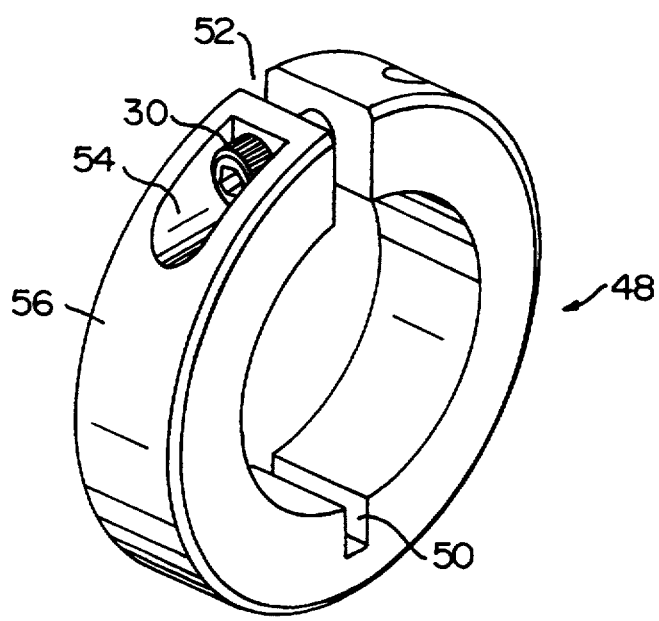
FIG. 4 is a perspective view of an additional embodiment of a clamping collar which may be utilized with the present invention.

FIG. 4 shows a clamping collar 48 which may also be used to secure a bearing assembly according to the teachings of the present invention. Clamping collar 48 includes a radial slot 50 angularly offset from circumferential gap 52. A recess 54 is provided in this case to harbor the head of screw 30 such that it does not protrude from outer surface 56 of collar 48.

Figure 5:
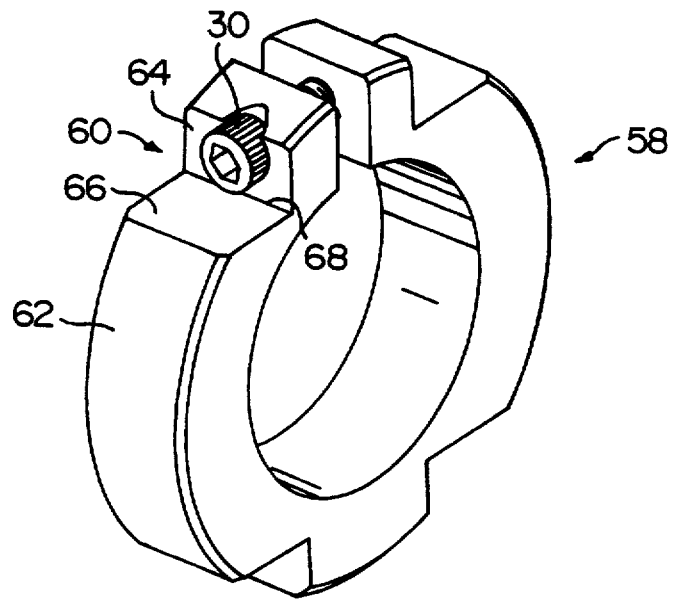
FIGS. 5 and 6 are perspective views respectively illustrating further embodiments of a clamping collar constructed in accordance with the present invention.
Figure 6:
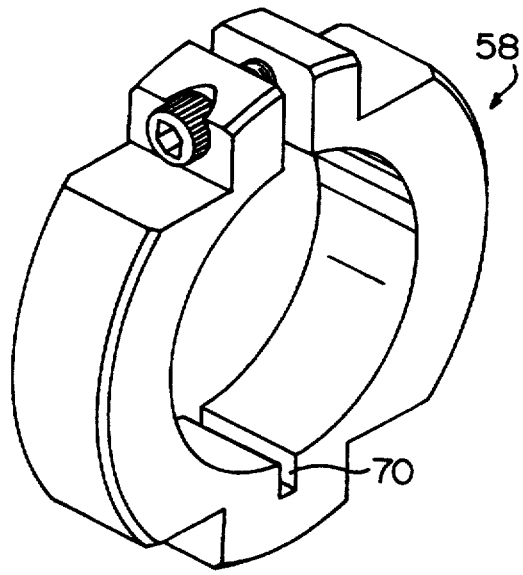

FIG. 5 illustrates a clamping collar 58 in which flexibility is enhanced utilizing a series of four notches, such as notch 60, defined in outer surface 62. As can best be seen with reference to notch 60, each of the notches is formed by a pair of planar surfaces, such as surfaces 64 and 66, which intersect at a vertex, such as vertex 68. Due to their shape, the notches may simply be machined into an otherwise annular collar. Additionally, the placement of notch 60 allows the threaded bore for screw 30 to be drilled into a flat surface (i.e., planar surface 64), which is also advantageous. This relative ease of manufacturing may make clamping collar 58 desirable in many applications. As shown in FIG. 6, clamping collar 58 may also include a radial slot 70 for still greater flexibility.

Figure 7:
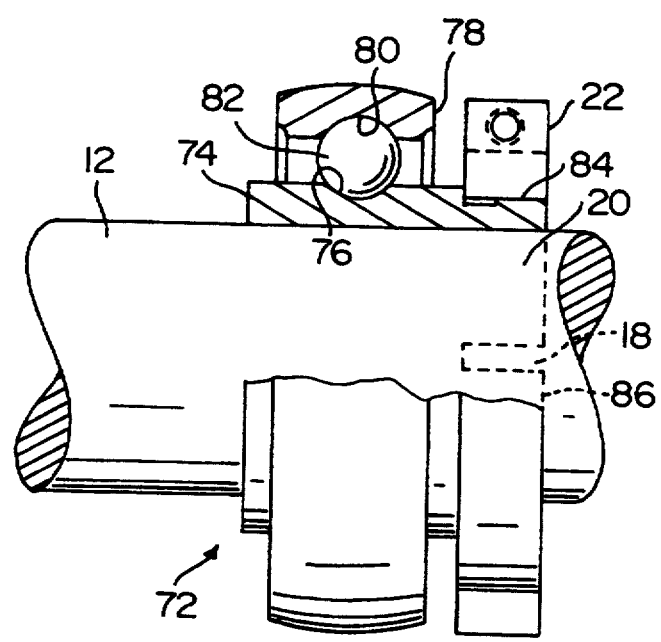
FIG. 7 is a partial cross-sectional view illustrating a clamping assembly of the invention utilized as part of a bearing insert structure.

The teachings of the present invention are applicable to bearing assemblies other than a pillow block assembly such as is shown in FIG. 1. For example, FIG. 7 illustrates a bearing insert 72 secured to shaft 12. Bearing insert 12 is partially cut away so that internal components may be easily seen. A clamping collar 22 as shown in FIG. 3 is utilized in this case although other clamping collars in accordance with the present invention may also be used.

Bearing insert 72 comprises an annular inner race 74 which defines a bore for passage of shaft 12. Additionally, inner race 74 defines a first annular raceway surface 76 on an outer surface thereof. An outer race 78 defines a second raceway surface 80 radially outward of surface 76 in axial alignment therewith. A plurality of bearing elements, such as ball bearing 82, are disposed between raceway surfaces 76 and 80 to permit relative rotation of outer race 78 with respect to inner race 74.

As can be seen, inner race 74 includes an integral clamping portion 84 which extends along shaft 12 in an axial direction. Slots 18 extend inwardly from the end 86 of clamping portion 84. Slots 18 thereby form clamping fingers 20 as described above. It will generally be desirable that the portion of inner race 74 having raceway surface 76 be hardened to reduce wear. Clamping portion 84 should remain relatively soft so that clamping fingers 20 are not excessively brittle.

While ball bearings have been illustrated, it should be appreciated by one skilled in the art that the particular type of bearing utilized is not critical to the present invention, and any suitable type of bearing may be utilized. These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to be limitative of the invention so further described in such appended claims.

What is claimed is:

1. A bearing assembly for receipt of a shaft therein, said bearing assembly comprising:
   a one-piece inner race defining a bore for receiving the shaft and further defining a first annular raceway surface, said inner race having an axially extending clamping portion, said clamping portion defining a plurality of circumferentially spaced axial slots forming clamping fingers;

an outer race defining a second annular raceway surface, said outer race situated such that said second annular raceway surface is radially outward of said first annular raceway surface generally in axial alignment therewith;

a plurality of bearing elements disposed between said first annular raceway surface and said second annular raceway surface;

an ungrooved clamping collar mountable about said clamping fingers, said clamping collar defining a circumferential gap therein having opposed gap faces and further defining a single rectangular flexibility enhancing relief indentation therein; and tightening means for drawing said opposed gap faces closer together to forcibly push said clamping fingers into clamping engagement with the shaft.

2. The bearing assembly as set forth in claim 1, wherein said single flexibility enhancing relief indentation includes a radial slot partially extending through said clamping collar.

3. The bearing assembly as set forth in claim 2, wherein said slot extends from an inner circumferential surface of said clamping collar.

4. The bearing assembly as set forth in claim 3, wherein said slot is angularly displaced from said circumferential gap generally by 180 degrees.

5. The bearing assembly as set forth in claim 4, wherein said clamping collar further has an integral bulging portion protruding from an outer circumferential surface of said clamping collar radially outward of said slot.

6. The bearing assembly as set forth in claim 5, wherein said clamping collar further has first and second integral lobes extending outwardly from said outer circumferential surface adjacent opposite sides of said circumferential gap, respectively.

7. The bearing assembly as set forth in claim 6, wherein said tightening means includes a screw within a screw bore defined in said first and second integral lobes.

8. The bearing assembly as set forth in claim 1, including a plurality of notches in an outer circumferential surface of said clamping collar.

9. The bearing assembly as set forth in claim 8, wherein said single flexibility enhancing relief indentation includes a radial slot partially extending through said clamping collar from an inner circumferential surface thereof.

10. The bearing assembly as set forth in claim 8, wherein each of said notches is formed by a pair of planar surfaces terminating at an intersecting vertex.

11. The bearing assembly as set forth in claim 10, wherein said plurality of notches includes at least four notches.

12. The bearing assembly as set forth in claim 1, wherein said outer race is mounted within a pillow block.

13. A bearing clamping assembly for securing a bearing to an elongated shaft, said clamping assembly comprising:

a one-piece annular member defining an axial bore for receiving the shaft therethrough, including a clamping portion axially extending, said clamping portion defining a plurality of circumferentially spaced axial slots extending inwardly from an end of said clamping portion thereby forming clamping fingers; a plurality of rolling element a generally annular clamping collar removably mountable about said clamping fingers, said clamping collar defining a circumferential gap therein having opposed gap faces and further defining a single flexibility enhancing rectangular radial slot therein; and tightening means for drawing said opposed gap faces closer together to forcibly push said clamping fingers into clamping engagement with the shaft.

14. The bearing clamping assembly as set forth in claim 13, wherein said slot extends from an inner circumference of said clamping collar.

15. The bearing clamping assembly as set forth in claim 13, wherein said slot is situated generally in angular opposition to said circumferential gap.

16. The bearing clamping assembly as set forth in claim 15, wherein said slot extends from an inner circumferential surface of said clamping collar and said clamping collar further includes an integral bulging portion protruding from an outer circumferential surface of said clamping collar.

17. The bearing clamping assembly as set forth in claim 16, wherein said clamping collar further has first and second integral lobes radially extending outwardly from said outer circumferential surface adjacent opposite sides of said circumferential gap, respectively.

18. The bearing clamping assembly as set forth in claim 13, further comprising a plurality of notches in an outer circumference of said clamping collar.

* * * * *